United States Patent Office 3,323,945
Patented June 6, 1967

3,323,945
PROCESS FOR THE CONTINUOUS PRODUCTION OF FIBER-CONTAINING SHAPED ARTICLES OF SYNTHETIC POLYAMIDE
Wilhelm Hechelhammer, Kurt Schneider, and Peter Popper, Krefeld-Bockum, Germany, assignors to Farbenfabriken Bayer Aktiengesellschaft, Leverkusen, Germany, a German corporation
No Drawing. Filed May 29, 1963, Ser. No. 283,995
Claims priority, application Germany, July 17, 1962, F 37,341
4 Claims. (Cl. 117—161)

The present invention is concerned with a process for the continuous production of fiber-containing shaped articles of synthetic polyamide.

It is known that the mechanical properties of thermoplastic synthetic resins, especially polyamides, can be significantly improved by the addition of fibrous filling materials, especially glass fibers. Thus, in particular, the tensile strength, the bending strength, the notch impact strength, as well as the heat stability are increased to a considerable extent. Glass fiber-strengthened polyamides are especialy suitable for the production of technical shaped parts which are mechanically stressed at high temperatures, such as crank gears, toothed wheels and components of electrical devices. In the case of polyamides, the otherwise strongly marked dependence of the mechanical properties on the water content is also practically completely overcome by the addition of glass fibers. Therefore, there exists a considerable need for a process for the production of fiber-containing polyamides which is simple and technically easy to carry out.

It has already been suggested to coat continuously glass silk hanks, so-called rovings, in suitable devices with a polyamide melt and to chop up the bristles, obtained after solidification of the melt, in known manner in a chopping machine to a granulate suitable for working up by injection moulding. However, this requires a considerable technical expediture and special measures in order to obtain a usable granulate since the coated roving can be chopped up in the usual chopping machines only with difficulty and a smooth cutting through of the glass fibers is not always ensured.

If, on the other hand, the incorporation of the glass fibers takes place by impregnation of the rovings with a polyamide melt, then there is certainly obtained a product which can be chopped up more easily but, as a result of the viscosity of the melt, it is very difficult and only possible with the help of special, technically expensive measures to achieve a comparatively uniform impregnation of the fiber hanks. In general, a granulate produced in this manner contains air inclusions which have a disturbing effect during the further working up and the glass fibers are unequally distributed so that, upon injecting, accumulations of glass fibers appear in the nozzles of the injection moulding machine and the glass fibers reach the shaped articles only partially and very unevenly.

We have now found that all the mentioned difficulties can be avoided and fiber-containing polyamide shaped articles can be produced in a simple manner by a process wherein a fiber skein is impregnated continuously with a known water-free lactam melt containing an alkaline polymerization catalyst and possibly a polymerization accelerator, the so-obtained lactam-containing fiber hank heated to polymerization temperature and the polymerizate continuous drawn off. Such a polymerization of lactams is known in the art per se as the so-called "ionic polymerization."

In this manner, fiber-containing profiled parts of all kinds, such as rods and bristles, can be continuously produced and can be directly further used as such. The process is especially suitable for the production of fiber-containing polyamide granulate which is intended for working up in injection moulding and extrusion machines. For this purpose, a fiber-containing polyamide bristle is produced by the process according to the present invention and subsequently chopped up in known manner to a granulate of any desired length.

As monomeric lactams there are to be considered for the process according to the present invention all cyclic lactams suitable for ionic polymerization, i.e. mainly those with at least 5 ring members, such as, for example, pyrrolidone and the lactams of the following -amino carbonic acids: amino valeric, amino capronic, amino oenanthic and amino caprylic acid.

The polymerization takes place in known manner in the presence of alkaline catalysts, for example, by the addition of alkali metals, such as lithium, sodium and potassium, alkali metal and alkaline earth metal hydrides, such as lithium hydride and calcium hydride, and alkali metal and alkaline earth metal, such as lithium, sodium, potassium, magnesium, calcium, strontium and barium oxides and hydroxides, at temperatures between about 120 and 300° C.

By the addition of polymerization accelerators, such as isocyanates, for example, butyl isocyanate, hexyl isocyanate, octyl isocyanate, cyclohexyl isocyanate, phenyl isocyanate, chlorphenyl isocyanate, naphthyl isocyanate, phenylene diisocyanate, or compounds which split off isocyanates, for example, dimere isocyanates, furthermore carbodiimides, for example, diisopropyl carbodiimide, dibutyl carbodiimide, dioctyl carbodiimide and dicyclohexyl carbodiimide, and cyanamides, for example, N,N-dimethyl cyanamide, N-cyclohexyl-N-methyl cyanamide, N,N-dicyclohexyl cyanamide, N-phenyl - N - methyl cyanamide, and N,N-di-(chlorophenyl)-cyanamide, as described in the U.S. specification No. 3,015,653, or acid derivatives, such as benzoyl chloride or tetrephthaloyl chloride, for example, according to the process described in the German patent specification No. 1,067,587, the polymerization velocity can possibly be considerably increased. In this case, if desired, the mentioned strongly alkaline catalysts can be replaced by less effective weakly basic catalysts, such as the sodium salts of aromatic hydroxy compounds, sodium dicarbonate, sodium acetate, and sodium benzoate. When polymerization accelerators are used, lower polymerization temperatures, i.e. lying below 200° C. can possibly also be preferred.

As fibrous fillers, all fiber materials can be used which can be arranged in endless hanks, especially glass fibers, but also asbestos fibers and the known natural and synthetic fiber materials.

For the carrying out of the process according to the present invention, all devices are suitable which permit the complete continuous impregnation of the fiber skein with the monomeric lactam melt containing the catalyst and possibly an accelerator, the heating of the so-obtained fiber skein to polymerization temperature and the shaping thereof. A suitable device consists, for example, of a funnel-shaped container filled with the lactam melt which opens into a pipe heated to the polymerization temperature. By continuously passing the fiber skein through the melt, it is completely impregnated with the liquid lactam. The polymerization of the lactam subsequently takes place in the pipe heated to the necessary temperature. In this way, there is continuously obtained a skein of fiber-containing polyamide which can, for example, subsequently be chopped up into a granulate of any desired length.

A fiber-containing polyamide granulate produced in this manner is completely free of air inclusions. Furthermore, the fibers are so uniformly dispersed in the polyamide mass that, upon working up by injection moulding, no accumulation of fibers occurs and the fibers are completely uniformly dispersed in the injection moulded parts.

Admittedly it is already known, in the production of shaped bodies from polyamides by ionic polymerization of cyclic lactams in moulds, to mix the lactam melt, before the polymerization in the mould, with powdered fillers of the most varied kind, such as metal powders or quent chopping up, a glass fiber-containing polyamide granulate of any desired length is obtained.

From a poly-ε-caprolactam granulate produced in this manner with a glass fiber content of 30%, there are produced, in an injection moulding machine, standard bodies, the properties of which are given in the following Table and compared with the results obtained with the same but unfilled polyamide.

TABLE

|  | Glass fiber strengthened | | Unstrengthened | |
|---|---|---|---|---|
|  | Newly moulded | Conditioned for 10 days | Newly moulded | Conditioned for 10 days |
| Bending strength | 1,796 | 1,616 | 1,092 | 865 |
| Deformation strength | 3.2 | 3.2 | 11.8 | 12.9 |
| Impact strength | 25.3 | 25.6 | 5.9 | 9.2 |
| Heat stability by Martens' method | >200 | >200 | 56 | 51 |
| Heat distortion: | | | | |
| 0.25 mm | >200 | 178 | 74 | 66 |
| 0.33 mm | >200 | 182 | 90 | 82 |
| 2.00 mm | >200 | 200 | 182 | 202 | metal oxides, as well as glass fibers, glass fabrics or fibers and fabrics of polyamides. However, at least when using additives with a higher specific weight than that of the lactam melt, this involves the risk of a partial sedimentation of the fillers during the polymerization, whereby uneven shaped bodies may result. In addition, such a process is, in general, only suitable for the production of fiber-containing blocks or sheets which may possibly be further worked up by mechanical, for example, cutting processes. In contradistinction thereto the process according to the present invention makes fiber-containing polyamides available to the whole field of injection moulding and extrusion technology in that it renders possible, in a simple manner, the continuous production of a fiber-containing polyamide granulate which is outstandingly suitable for working up by injection moulding and thus constitutes a considerable technical advance in comparison with the known processes.

The following example is given for the purpose of illustrating the present invention:

Example

A melt of ε-caprolactam is mixed with 0.4% by weight of phenyl isocyanate and 0.04% by weight of metallic sodium and placed under nitrogen in a funnel which runs out into a pipe having the dimensions which are necessary for the granulate to be obtained. At the same time, a glass fiber skein to be impregnated is passed continuously through the melt and the pipe heated to 200 to 250° C. The caprolactam thereby polymerizes in the pipe and gives, upon emergence, a skein which, according to the width of the pipe and the thickness of the glass fiber skein, contains 5 to 40% of glass fiber. By the slow drawing off of the skein and continuous addition of the melt, the working method can be carried out continuously. By subsequent chopping up In the same manner the other lactams mentioned above may be worked to granulates and shaped articles respectively.

We claim:

1. Process for the production of fiber-containing synthetic polyamide shaped articles which comprises continuously impregnating a fiber skein with an anhydrous polymerizable lactam melt containing an alkaline polymerization catalyst, heating the resultant lactam-containing fiber skein to polymerization temperature and drawing off the polymerizate continuously.

2. Process according to claim 1, wherein the lactam melt also contains a polymerization accelerator.

3. Process according to claim 2, wherein the accelerator is selected from the group consisting of isocyanates, carbodimides and cyanamides.

4. An article of manufacture comprising a fiber skein which has been continuously impregnated with an anhydrous polymerizable lactam melt containing an alkaline polymerization catalyst and a polymerization accelerator and has thereafter been continuously heated to polymerization temperature.

References Cited

UNITED STATES PATENTS

| 3,042,570 | 7/1962 | Bradt | 264—174 |
| 3,047,541 | 7/1962 | Ryffel et al. | |
| 3,206,418 | 9/1965 | Giberson | 117—126 X |
| 3,228,759 | 1/1966 | Small et al. | |

ALFRED L. LEAVITT, *Primary Examiner.*

W. L. SOFFIAN, *Assistant Examiner.*